(12) United States Patent
Cruz

(10) Patent No.: US 8,329,276 B2
(45) Date of Patent: *Dec. 11, 2012

(54) EASY-OPEN RECLOSABLE FILMS HAVING AN INTERIOR FRANGIBLE INTERFACE AND ARTICLES MADE THEREFROM

(75) Inventor: Tara Kay Cruz, Appleton, WI (US)

(73) Assignee: Curwood, Inc., Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,177

(22) Filed: Mar. 8, 2011

(65) Prior Publication Data

US 2011/0162993 A1  Jul. 7, 2011

Related U.S. Application Data

(63) Continuation-in-part of application No. 11/247,923, filed on Oct. 11, 2005, now Pat. No. 7,927,679.

(51) Int. Cl.
*B32B 9/00* (2006.01)
*B32B 7/12* (2006.01)

(52) U.S. Cl. ............. 428/40.1; 428/41.7; 428/41.8; 428/41.9; 428/42.2; 428/42.3; 428/355 R; 428/355 EN

(58) Field of Classification Search ............ 428/40.1, 428/41.7, 41.8, 41.9, 42.2, 42.3, 355 R, 355 EN
See application file for complete search history.

(56) References Cited

U.S. PATENT DOCUMENTS

| | | | |
|---|---|---|---|
| 4,673,601 A | 6/1987 | Lamping et al. | |
| 4,704,314 A * | 11/1987 | Hsu et al. | 428/95 |
| 5,063,644 A | 11/1991 | Herrington et al. | |
| 5,089,320 A | 2/1992 | Straus et al. | |
| 5,301,394 A | 4/1994 | Richardson et al. | |
| 5,442,837 A | 8/1995 | Morgan | |
| 5,545,420 A | 8/1996 | Lipinski et al. | |
| 5,964,532 A | 10/1999 | St. Phillips et al. | |
| 6,409,384 B1 | 6/2002 | Provan et al. | |
| 6,439,770 B2 | 8/2002 | Catchman | |
| 6,524,002 B2 | 2/2003 | Tomic | |
| 6,527,444 B1 | 3/2003 | Buchman | |
| 6,609,827 B2 | 8/2003 | Bois et al. | |
| 6,616,333 B2 | 9/2003 | Kinigakis et al. | |
| 6,632,021 B2 | 10/2003 | Bois et al. | |
| 6,663,283 B1 | 12/2003 | Cappel | |
| 6,666,580 B2 | 12/2003 | Bois | |
| 6,679,027 B2 | 1/2004 | Schreiter | |
| 7,422,782 B2 * | 9/2008 | Haedt et al. | 428/41.7 |
| 7,927,679 B2 * | 4/2011 | Cruz et al. | 428/40.1 |
| 2002/0097923 A1 | 7/2002 | Dobreski et al. | |
| 2002/0196987 A1 | 12/2002 | Tilman et al. | |
| 2004/0077759 A1 | 4/2004 | Bardiot et al. | |

FOREIGN PATENT DOCUMENTS

EP  1582342  3/2005

* cited by examiner

*Primary Examiner* — Patricia Nordmeyer
(74) *Attorney, Agent, or Firm* — Tom J. Hall

(57) ABSTRACT

The present invention relates to peelable resealable multi-layer films which include at least a first thermoplastic layer of an anhydride-modified polyolefin, a second thermoplastic layer of an ethylene/vinyl alcohol copolymer and a third thermoplastic layer of a tacky pressure-sensitive adhesive. The bond formed between a second layer of ethylene/vinyl alcohol copolymer and a third layer of a tacky pressure-sensitive adhesive creates a peelable resealable interface having a first interfacial peel strength, A, and a second interfacial peel strength, B.

46 Claims, 4 Drawing Sheets

EASY-OPEN RECLOSABLE FILMS HAVING AN INTERIOR FRANGIBLE INTERFACE AND ARTICLES MADE THEREFROM

This application is a continuation-in-part application of U.S. patent application Ser. No. 11/247,923, filed on Oct. 11, 2005, which is incorporated herein by reference in its entirety.

BACKGROUND OF THE INVENTION

The present invention generally relates to multilayer films for packaging applications, and particularly, to multilayer thermoplastic films for flexible packages which have both an easy-open and a reclosable feature.

Flexible packages which combine an easy-open feature with reclosability provide consumers with a convenient means to open a package without the use of scissors, knives or other cutting implements, and a reliable manner to re-close the package as often as needed. Various methods have been used to provide both these features which include, for example, mechanical strips, such as interlocking fasteners or zippers, and adhesive strips positioned on an exterior film surface or within the film structure. These methods are known in the art and have been disclosed in U.S. Pat. Nos. 5,063,644; 5,301,394; 5,442,837; 5,964,532; 6,409,384; 6,439,770; 6,524,002; 6,527,444; 6,609,827; 6,616,333; 6,632,021; 6,663,283; 6,666,580; 6,679,027; and U.S. Patent Application Nos. 2002/0097923; and 2002/0196987, each of which is incorporated by reference herein. These easy-open/reclosable means all require additional steps in the manufacturing of attaching or incorporating the strips onto or into the package and the extra cost of the strips themselves. It would be desirable to provide a thermoplastic film having an easy-open feature and reclosability without the additional processing steps and associated cost as mentioned in the prior art.

SUMMARY OF THE DISCLOSURE

The present invention provides peelable resealable multilayer films comprising at least a thermoplastic first layer, a thermoplastic second layer and a thermoplastic third layer such that the second layer is in direct contact with and bonded to the first and third layers. The films according to the present invention may be considered "peelable" when the bond between second and third layers comprise a peelable resealable interface adapted to separate by application of pulling or peeling force exerted away from the film which has been heat-sealed to itself or a second thermoplastic film. The force required to separate the interface may be dependent upon the chemical composition of each of the two interior film layers, i.e., the chemical similarities or dissimilarities of each film layer, or both the chemical composition and thickness of each interior film layer. By separating at least a portion of the interface, the face-to-face surfaces of each interior film layer are exposed. The films according to the present invention may also be considered "resealable" when the bond between the two interior layers forms an interface adapted to reseal after separation. Generally, the force required to "reseal" the interface is proportional to the manual pressure exerted on the film. Accordingly, the peelable resealable interface of the films, according to the present invention, may include a first interfacial peel strength "A" and a second interfacial peel strength "B".

As a first aspect, the present disclosure is directed to peelable resealable multilayer films which include at least a first, thermoplastic interior-film layer of an anhydride-modified polyolefin, a second, thermoplastic interior-film layer of an ethylene/vinyl alcohol copolymer and a third, thermoplastic interior-film layer of a tacky pressure-sensitive adhesive, wherein the second layer is in direct contact with and bonded to both the first and third layers. The bond formed between the second layer (i.e., ethylene/vinyl alcohol copolymer) and the third layer (i.e., tacky pressure-sensitive adhesive) forms a peelable resealable interface having a first interfacial peel strength "A" and a second interfacial peel strength "B". The peelable resealable interface is adapted to remain secure and unbroken during package fabrication, distribution and storage, and yet may be easily and repeatedly separated and rejoined. Accordingly, the peelable resealable interface includes a first interfacial peel strength, A, having a value of between 1000 gram-force/inch (175.1 Newton/meter) and 5000 gram-force/inch (875.5 Newton/meter) as measured in accordance with ASTM F-904-98 test method when the films of the present invention are peeled from a second thermoplastic film to which the film has been heat-sealed. The second interfacial peel strength, B, has a value of between 350 gram-force/inch (61.3 Newton/meter) and 1000 gram-force/inch (175.1 Newton/meter) as measured in accordance with ASTM F-904-98 test method when the films are peeled from and re-adhered to a second film. Moreover, the first interfacial peel strength, A, and the second interfacial peel strength, B, are such that the relative values of A and B satisfy the relationship $A \geq B$.

As a second aspect, the present invention provides at least a five-layer peelable resealable multilayer film having a first, thermoplastic interior-film layer comprising an anhydride-modified polyolefin, a second, thermoplastic interior-film layer of an ethylene/vinyl alcohol copolymer, a third, thermoplastic interior-film layer of a tacky pressure-sensitive adhesive, a fourth, thermoplastic interior-film layer and a fifth, thermoplastic exterior-film layer, all of which includes a peelable resealable interface formed between the second and third layers. Accordingly, the peelable resealable interface has a first interfacial peel strength "A" and a second interfacial peel strength "B" as described above. This aspect of the present invention includes multilayer peelable resealable film where the second layer is in direct contact with and bonded to both first and third layers, the fourth layer is in direct contact with and bonded to the first layer, and the fifth layer is in direct contact with and bonded to the third layer.

As a third aspect, the present invention provides at least a six-layer peelable resealable multilayer film having a first, thermoplastic interior-film layer comprising an anhydride-modified polyolefin, a second, thermoplastic interior-film layer of an ethylene/vinyl alcohol copolymer, a third, thermoplastic interior-film layer of a tacky pressure-sensitive adhesive, a fourth, thermoplastic exterior-film layer, a fifth, thermoplastic interior-film layer, and a sixth, thermoplastic exterior-film layer, all of which includes a peelable resealable interface formed between the second and third layers. Accordingly, the peelable resealable interface has a first interfacial peel strength "A" and a second interfacial peel strength "B" as described above. This aspect of the present invention includes a multilayer peelable resealable film where the second layer is in direct contact with and bonded to both the first and third layers, the fourth layer is in direct contact with and bonded to the first layer, a fifth layer is in direct contact with and bonded to the third layer, and the sixth layer is in direct contact with and bonded to the fifth layer.

As a fourth aspect, the present invention provides at least a seven-layer peelable resealable multilayer film having a first, thermoplastic interior-film layer comprising an anhydride-modified polyolefin, a second, thermoplastic interior-film layer of an ethylene/vinyl alcohol copolymer, a third, thermoplastic interior-film layer of a tacky pressure-sensitive adhesive, a fourth, thermoplastic exterior-film layer, a fifth, thermoplastic interior-film layer, a sixth, thermoplastic interior-film layer, and a seventh, thermoplastic exterior-film layer, all of which includes a peelable resealable interface formed between the second and third layers. Accordingly, the peelable resealable interface has a first interfacial peel strength "A" and a second interfacial peel strength "B" as described above. This aspect of the present invention includes a multilayer peelable resealable film where the second layer is in direct contact with and bonded to both the first and third layers, the fourth layer is in direct contact with and bonded to the first layer, a fifth layer is in direct contact with and bonded to both the third and sixth layers, the sixth layer is in direct contact with and bonded to both the fifth and seventh layers.

As a fifth aspect, the present invention provides peelable resealable packages formed of a multilayer thermoplastic film structure as set forth above in connection with the first, second, third or fourth aspects of the invention. Preferably, the films may be thermoformable or non-thermoformable such that they may be suitable for use as a lidding portion, a semi-rigid or rigid preformed tray portion, or both the lidding and tray portions of a container. Films according to the present invention may form peelable reclosable packages or a portion thereof by heat sealing together two exterior film surfaces of a single film, the exterior surface of the one film to an exterior surface of a second compositionally similar film, or the exterior surface of one film to the exterior surface of a compositionally different thermoplastic film.

DETAILED DESCRIPTION OF THE DISCLOSURE

Figure 1:
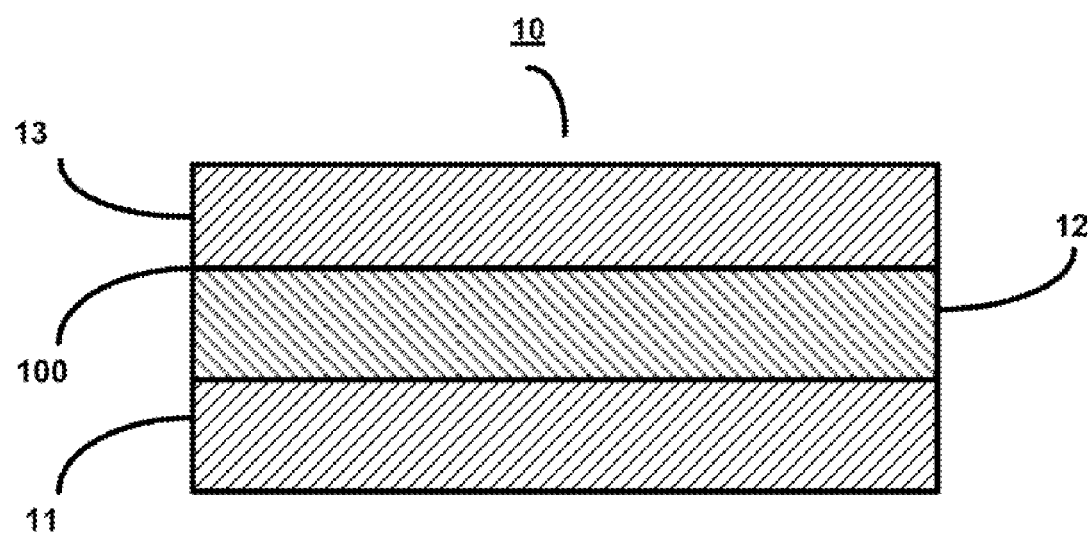
FIG. 1 shows a diagrammatic cross-sectional view of a peelable resealable multilayer film having three thermoplastic layers according to the present disclosure.

As used herein, the term "film" is use in the generic to include plastic web, regardless of whether it is a film or sheet.

As used herein, the term "thermoplastic" refers to a polymer or polymer mixture that softens when exposed to heat and then returns to its original condition when cooled to room temperature. In general, thermoplastic materials include, but are not limited to, synthetic polymers such as polyolefins, polyesters, polyamides, polystyrenes, and the like. Thermoplastic materials may also include any synthetic polymer that is cross-linked by either radiation or chemical reaction during the manufacturing or post manufacturing process operation.

As used herein, the term "polymer" refers to a material which is the product of a polymerization or copolymerization reaction of natural, synthetic, or natural and synthetic monomers and/or comonomers, and is inclusive of homopolymers, copolymers, terpolymers, etc. In general, the layers of a film of the present invention may comprise a single polymer, a mixture of a single polymer and non-polymeric material, a combination of two or more polymer materials blended together, or a mixture of a blend of two or more polymer materials and non-polymeric material. It will be noted that many polymers may be synthesized by the mutual reaction of complementary monomers. It will also be noted that some polymers are obtained by the chemical modification of other polymers such that the structure of the macromolecules that constitute the resulting polymer can be thought of as, having been formed by the homopolymerization of a hypothetical monomer.

As used herein, the term "copolymer" refers to a polymer product obtained by the polymerization reaction or copolymerization of two monomer species. Copolymer may also be referred to as bipolymers. The term "copolymer" is also inclusive of the polymerization reaction of three, four or more monomer species having reaction products referred to as terpolymers, quaterpolymers, etc. As used herein, a copolymer identified in terms of a plurality of monomers, e.g., ethylene/propylene copolymer, refers to a copolymer in which either monomer may copolymerize in a higher weight or molar percent than the other monomer or monomers. It is appreciated by a person of ordinary skill in the art that the term "copolymer," as used herein, refers to those copolymers where the first listed comonomer is polymerized in a higher weight percent than the second listed comonomer.

As used herein, the terms "coextruded" or "coextrusion" refer to the process of extruding two or more polymer materials through a single die with two or more orifices arranged so that the extrudates merge and weld together into a laminar structure before chilling, i.e., quenching. The films according to the present invention may be fabricated by any coextrusion method known to a person of ordinary skill in the art which may be include, but is not limited to, for example, blown film coextrusion, slot cast coextrusion, and extrusion coating, preferably, slot cast and single-bubble blown film, and more preferably, single-bubble blown film.

As used herein, the term "oriented" herein refers to a mono-layer thermoplastic film (e.g., a film layer) and multilayer thermoplastic film which have been elongated in one or two directions at elevated temperatures followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the polymeric film. Following orientation, the oriented film is preferably cooled and then heated to an elevated temperature, most preferably to an elevated temperature which is above the glass transition temperature and below the crystalline melting point of the polymer. This reheating step, which may be referred to as annealing or heat setting, is performed in order to provide a mono-layer or multilayer film with an unrestrained linear thermal shrinkage in the machine direction and/or transverse direction of less than 10%, preferably, less than 5%, and more preferably, less than 2% at 85° C. as measured in accordance with ASTM D-2732-96 test method, which is incorporated herein by reference. The oriented films can be annealed or heated to an elevated temperature either in-line with (and subsequent to) or off-line from (in a separate process) the orientation process. However, an annealing process which is in-line with the orientation process is preferred.

"Peelable" and like terminology is used herein to refer to any substrate interface which are engineered to be readily peelable (or delaminate within a particular film layer or between two film layers) without uncontrolled or random tearing or rupturing the packaging materials which may result in premature destruction of the packaging film and package made therefrom. A peelable interface is one that can be manually peeled apart to open a package without resort to a knife or other implement to tear or rupture the web. In the present invention, the peelable layer interface must have a seal strength sufficient to prevent failure of the seal during the normal stuffing process and further normal handling and transport of the packaged article. The seal strength must also be low enough to permit manual opening of the seal. Preferably, parameters such as choice of materials and lamination conditions will be used to adjust the seal strength to the desired level for the particular package web and packaging application.

As used herein, the phrase "peel strength" refers to the force required to separate at least a portion of the interface between two adjoining interior film layers of the present invention when the film has been sealed to a second thermoplastic film. The peel strength may depend on the chemical similarity or dissimilarity of the two film layers and their individual thickness. Peel strength may also be affected by the composition and thickness of adjacent film layers which are ruptured during the separation of the interface. Peel strength may still further be affected by environmental conditions during film fabrication, the packaging process and whether there has been an initial separation of the interface and the number of times the interface has been separated and resealed. One method for determining bond strength is ASTM F-904 test method entitled, "Standard Test Method for Comparison of Bond Strength or Ply Adhesion of Similar Laminates Made from Flexible Materials" and published by ASTM International, West Conshohocken, Pa., U.S.A., which is herein incorporated by reference in its entirety. As referred to film structures of the present invention, peel strengths were determined in accordance with ASTM F-904 test method and included a modification to the test procedure. The modification entailed preparing test specimens by heat-sealing the surface of the subject film along its entire length to a second thermoplastic film with an end-portion of the subject film unsealed to the second film. With the test specimens prepared in this manner, the unsealed end-portion of the subject film was then peeled from the second film at an angle of at 180° relative to the second film.

As used herein, the phrase "interior-film layer," as applied to film of the present invention, refers to any film layer having both its principal surfaces directly adhered to another layer of the film. In contrast, the phrase "exterior-film layer" refers to any film layer having only one of its principal surfaces directly adhered to another layer of the film.

As used herein, the phrase "direct contact and bonded" as applied to film layers of the present invention, defines a subject film layer having face-to-face contact to another film layer (presumably, over their entire planar surfaces).

As used herein, the term "heat-seal" refers to both a film layer which is heat sealable to itself or other thermoplastic film layer, and the formation of a fusion bond between two polymer surfaces by conventional indirect heating means. It will be appreciated that conventional indirect heating generates sufficient heat on at least one film contact surface for conduction to the contiguous film contact surface such that the formation of a bond interface therebetween is achieved without loss of the film integrity.

As used herein, the phrase "tacky pressure-sensitive adhesive" refers to adhesives which may be used to affix the surface of one film layer to the surface of another film layer with application of manual pressure. Preferably, the tacky pressure-sensitive adhesive may also allow one surface to be removed and/or repositioned from the other surface. Pressure-sensitive adhesives may include a combination of a tackifier first component and an elastomer second component of rubber, acrylic, silicone, or blends thereof. These pressure-sensitive adhesives are known in the art and are described in U.S. Pat. Nos. 4,673,601 and 5,089,320, which are incorporated herein by reference in their entireties. Preferably, the pressure-sensitive adhesive refers to those adhesives which may be coextruded using slot cast or blown film coextrusion methods. Preferably, the pressure-sensitive adhesive may comprises both a tackifier and an elastomer of styrene/rubber copolymer. A particular suitable tacky pressure-sensitive adhesive for use in the present invention includes, but is not limited to, for example, a material having a density of 0.96 g/cm$^3$ which is sold under the product name FINDLEY® M3156 from Bostik Findley, Inc., Wauwatosa, Wis., U.S.A.

As used herein, the phrase "laminating adhesive" refers to adhesives which may be used to join two web substrates together. Laminating adhesives may be classified by application type, including for example, solvent borne, solventless (100% solids), waterborne, radiation curable and may include a single and multi-component adhesive systems. Preferably, laminating adhesives include adhesive systems used to join at least one coextruded film to another monolayer or multilayer film. Suitable examples of laminating adhesives for use in the present invention include, but are not limited to, polyvinylidene chloride emulsions, particularly, SERFENE™ 2010 available from Rohm and Haas Company, Philadelphia, Pa.; polyether urethane two-component adhesives, particularly, LAMAL™ HAS available from Rohm and Haas Company, Philadelphia, Pa. and two-component polyurethane pre-polymer adhesive, AVADYNE AV5210/CA500, available from the Pierce & Stevens Corporation, Buffalo, N.Y.

As used herein, terminology employing a "/" with respect to the chemical identity of any copolymer, e.g., an ethylene/unsaturated ester copolymer, identifies the comonomers which are copolymerized to produce the copolymer.

As used herein, the phrase "polyolefin" refers to homopolymers and copolymers derived from simple olefins; among the more important are polyethylene, polypropylene, polybutene, polyisoprene and their copolymers. Examples of suitable polyethylenes (PE) include, but is not limited to, low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), and polyethylenes comprising ethylene/α-olefin copolymers* (E/AO). These ethylene/α-olefin copolymers are copolymers of ethylene with one or more α-olefins (alpha-olefins) such as butene-1, hexene-1, octene-1, or the like as a comonomer. Other polyethylene copolymers include materials, Such as, for example, ethylene/unsaturated ester copolymer which includes, but is not limited to, ethylene/vinyl acrylate copolymer (EVA), ethylene/methacrylate copolymer (EMA), ethylene/butyl acrylate copolymer (EBA). Further examples of polyolefin copolymers include cyclic olefin copolymers (COC), ethylene/propylene copolymers (PEP), propylene/ethylene copolymer (PPE), poly-3-methylbutene-1, poly-4-methylpentene-1, and propylene/α-olefins (P/AO) which are copolymers of propylene with one or more α-olefins (alpha-olefins) such as butene-1, hexene-1, octene-1, or the like as a comonomer. Exemplary of commercially available polyethylenes suitable for use in the present invention include, but are not limited to, the linear low-density polyethylene family of resins supplied by ExxonMobil Chemical Company, Houston, Tex., U.S.A. A particularly suitable grade includes, but is not limited to, for example, ExxonMobil ESCORENE® LLDPE LL1001.32 having a melt index of 1.0 dg/min., a density of 0.918 g/cm³, and a melting point of 121° C. An example of a commercially available polypropylene suitable for use in the present invention is sold under the trademark BP Amoco ACCLEAR® 6219 from Innovene, Chicago, Ill., U.S.A. Exemplary of commercially available cyclic olefin copolymers suitable for use in the present invention include, but are not limited to, the TOPAS® family of resins, e.g., TOPAS® 8007 grade having a glass transition temperature of 80° C., a tensile strength of 9600 psi, and a tensile modulus of 377,000 psi, which is supplied by Celanese-Ticona, Summit, N.J., U.S.A.

As used herein, the phrase "modified polyolefin", refers to a chemical derivative of a polyolefin, e.g., a polyolefin having any form of anhydride functionality, such as anhydride of maleic acid, crotonic acid, citraconic acid, itaconic acid, fumaric acid, etc., whether grafted onto a polymer, copolymerized with a polymer, or blended with one or more polymers. Exemplary of commercially available anhydride-modified polyolefins suitable for use in the present invention include, but are not limited to, the BYNEL® family of resins, e.g., BYNEL® 41E687 grade having melt index of 1.7 dg/min. (at 190° C.), a density of 0.91 g/cm³, a melting point of 119° C., which is supplied by du Pont de Nemours and Company, Wilmington, Del., U.S.A.

As used herein, the term "ionomer" refers to an ionic copolymer formed from an olefin and an ethylenically unsaturated monocarboxylic acid having the carboxylic acid moieties partially neutralized by a metal ion. Suitable metal ions may include, but are not limited to, potassium, lithium, cesium, nickel, zinc and preferably sodium. Suitable carboxylic acid comonomers may include, but are not limited to, ethylene/methacrylic acid, methylene succinic acid, maleic anhydride, vinyl acetate/methacrylic acid, methyl/methacrylate/methacrylic acid, styrene/methacrylic acid and combinations thereof. Useful ionomer resins may include an olefinic content of at least 50% (mol.) based upon the copolymer and a carboxylic acid content of between 5-25% (mol.) based upon the copolymer. Useful ionomers are also described in U.S. Pat. No. 3,355,319 to Rees, which is incorporated herein by reference in its entirety. Exemplary of commercially available ionomers suitable for use in the present invention include, but are not limited to, the SURLYN® family of resins, e.g., SURLYN® 1601 grade having a density of 0.940 g/cm³, a melt flow index of 1.30 dg/min. (at 190° C.), a Vicat softening point of 73.9° C., which is supplied by du Pont de Nemours and Company, Wilmington, Del., U.S.A.

The phrase "glass transition temperature" as used herein means the temperature at which a polymer changes from an amorphous glassy state to a rubbery state, and in the transition region, various properties such as an elastic modulus, an expansion coefficient, a heat content, a refractive index, a dielectric constant, and so forth, are changed. The glass transition temperature can be measured from the change of these properties, but more definitely, this can be evaluated by a known method by using differential scanning calorimetry (DSC) or dynamic mechanical analysis (DMA). When measuring the glass transition temperature by the differential scanning calorimetry, the glass transition temperature can be determined by ASTM D-3417 test method, which is incorporated herein by reference. Alternatively, ASTM E-1640-04 test method may be used to determine the glass transition temperature by dynamic mechanical analysis, the disclosure of which is incorporated herein by reference.

As used herein, the phrase "ethylene/vinyl alcohol copolymer" refers to hydrolyzed copolymers of ethylene and vinyl acetate monomers. Ethylene/vinyl alcohol copolymers can be represented by the general formula: $[(CH_2-CH_2)_n-(CH_2-CH(OH))_m]$. Exemplary of commercially available ethylene/vinyl alcohol copolymers suitable for use in the present invention include, but are not limited to, the SOARNOL® family of resins, e.g., SOARNOL® ET3803 grade having a reported bulk density of 0.64-0.74 g/cm³, a relative density of 1.13-1.22 g/cm³, a melting point of between 164° C. and 188° C., which may be obtained from The Nippon Synthetic Chemical Industry Company, Ltd. (Nippon Gohsei), Osaka, Japan.

As used herein, the phrase "styrene/rubber copolymer" refers to block copolymers including di-block, tri-block, radial block, multi-block and mixtures thereof of styrene and rubber. Suitable rubber segment of styrene/rubber copolymers may include, but are not limited to, butadiene, isoprene, butylene, ethylene-butylene, propylene, ethylene-propylene, ethylene and blends thereof. Exemplary styrene/rubber copolymers which are commercially available include styrene/rubber copolymers sold under the trademark KRATON® by Kraton Polymers, Houston, Tex., U.S.A. Styrene/rubber copolymers are fully disclosed in U.S. Pat. No. 5,221,534, the disclosure of which is incorporated herein by reference. As used herein, the term "tackifier" is generally an adhesive additive which serves to modify the rheological properties of the final adhesive. Specifically, a tackifier resin is used to improve the tack of the adhesive composition. As used herein, the term "tack" refers to the "stickiness" of the adhesive or its resistance to removal or deformation from a substrate. The tackifier may comprise any suitable material, preferably, a hydrocarbon resin material or mixtures thereof. Exemplary tackifiers are ESCOREZ® 1102, ESCOREZ® 1304, ESCOREZ® 1315, available from ExxonMobil Chemical Company, Houston, Tex., U.S.A.; WINGTAK® resins available from Sartomer Company, Inc., Exton, Pa., U.S.A.; PICCOTAC® 1100 and POLYPALE® 100 available from Eastman Chemicals, Kingsport, Tenn., U.S.A.

With reference to the drawings, there is seen in FIG. 1 a peelable resealable multilayer film 10 having a first, thermoplastic layer 11 comprising an anhydride-modified polyolefin, a second, thermoplastic layer 12 comprising an ethylene/vinyl alcohol copolymer, and a third thermoplastic layer 13 comprising a tacky pressure-sensitive adhesive. As depicted, second polymer layer 12 is in direct contact and bonded to both first polymer layer 11 and third layer 13. It has been discovered that the interface 100 formed between an ethylene/vinyl alcohol copolymer layer 12 and a tacky pressure-sensitive adhesive layer 13 is a peelable interface. The force required to separate interface 100, initially and thereafter, may vary depending upon the individual chemical composition and thickness of each of the second and third layers 12 and 13. The force required to initially separate interface 100 can be identified as first interfacial peel strength "A". In one embodiment, the value of A may be between 1000 gram-force/inch and 5000 gram-force/inch. In another embodiment, the value of A may be between 2000 gram-force/inch and 5000 gram-force/inch. It will be noted that the force required for separating first layer 11 from second layer 12 is greater than the force needed to separate peelable interface 100. It has been further discovered that when an interface 100 is formed between an ethylene/vinyl alcohol copolymer layer 12 and a tacky pressure-sensitive adhesive layer 13, interface 100 is peelable and resealable. As such, when interface 100 is initially separated and resealed to itself, the amount of force required to subsequently re-separate the interface can be identified as second interfacial peel strength "B". In one embodiment, the value of B is between 350 gram-force/inch and 1000 gram-force/inch. In another embodiment, the value of B is between 500 gram-force/inch and 1000 gram-force/ inch. In still another embodiment, the value of B is between 600 grain-force/inch and 800 gram-force/inch. Preferably, the relative values of A and B satisfy the relationship A≧B.

Preferably, first layer 11 comprises between 50% by weight and 100% by weight of an anhydride-modified polyolefin, and more preferably, between 50% by weight and 100% by weight of an anhydride-modified polyethylene. Preferably, second layer 12 comprises between 50% by weight and 100% by weight of an ethylene/vinyl alcohol copolymer. Preferably, third layer 13 comprises 50% by weight and 100% by weight of a tacky pressure-sensitive adhesive and more preferably, between 50% by weight and 100% by weight of a tacky pressure-sensitive adhesive comprising a tackifier first component and an elastomer second component of styrene/rubber copolymer.

It will be also appreciated by those skilled in the art that film 10 may be formed as a three-layer substructure of a film having 4-7 or more film layers.

Figure 2:
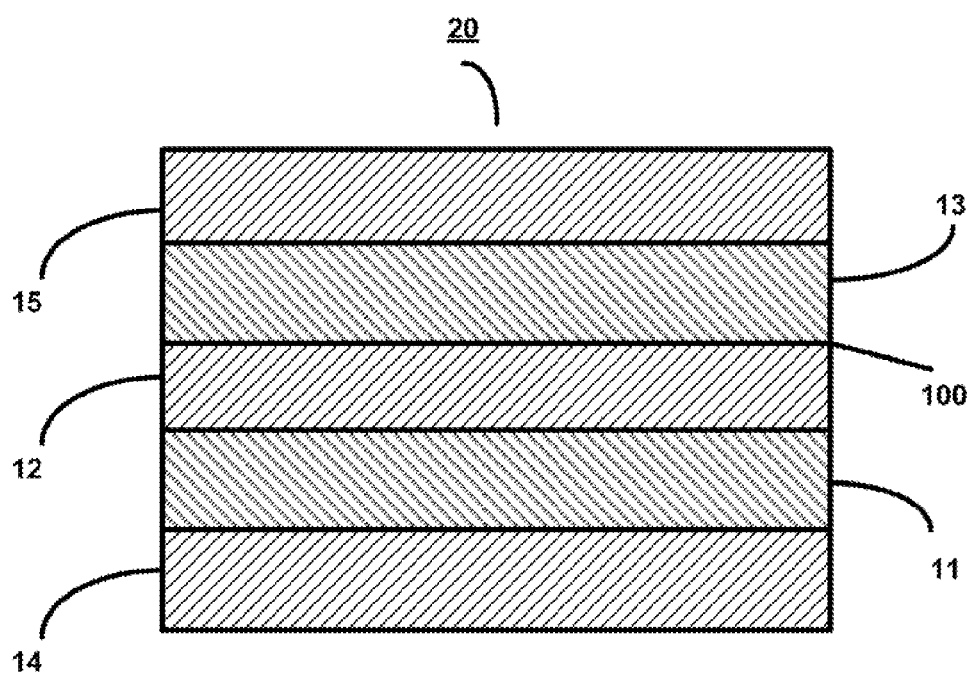
FIG. 2 shows a diagrammatic a cross-sectional view of a peelable resealable multilayer film having five thermoplastic layers according to the present disclosure.

Turning to FIG. 2, there is shown peelable resealable multilayer film 20 incorporating first layer 11, second layer 12 and third layer 13 of film 10 incorporated into a five-layer film structure. In this embodiment of the present invention, a fourth layer 14 is an exterior-film layer and is in direct contact with and bonded to the first layer 11, and a fifth layer 15 is an exterior-film layer and is in direct contact with and bonded to the third layer 13. Fourth layer 14 may comprise a material selected from the group consisting of polyolefin, ionomer or blends thereof. Preferably, fourth layer 14 comprises a polyethylene, more preferably, a low density polyethylene, and most preferably, between 50% by weight and 100% by weight of a low density polyethylene. As depicted in this embodiment, fourth layer 14 is an exterior film layer. It is contemplated that fourth layer 14 may be heat-sealable. Fifth layer 15 may comprise a material selected from the group consisting of polyolefin, ionomer or blends thereof. Preferably, fifth layer comprises a blend of a linear low density polyethylene and a low density polyethylene, and more preferably, between 50% by weight and 100% by weight of a blend of linear low density polyethylene and low density polyethylene.

Film 20 further includes peelable/resealable interface 100. The values of A and B may be identical to those described for film 10 above.

Figure 3:
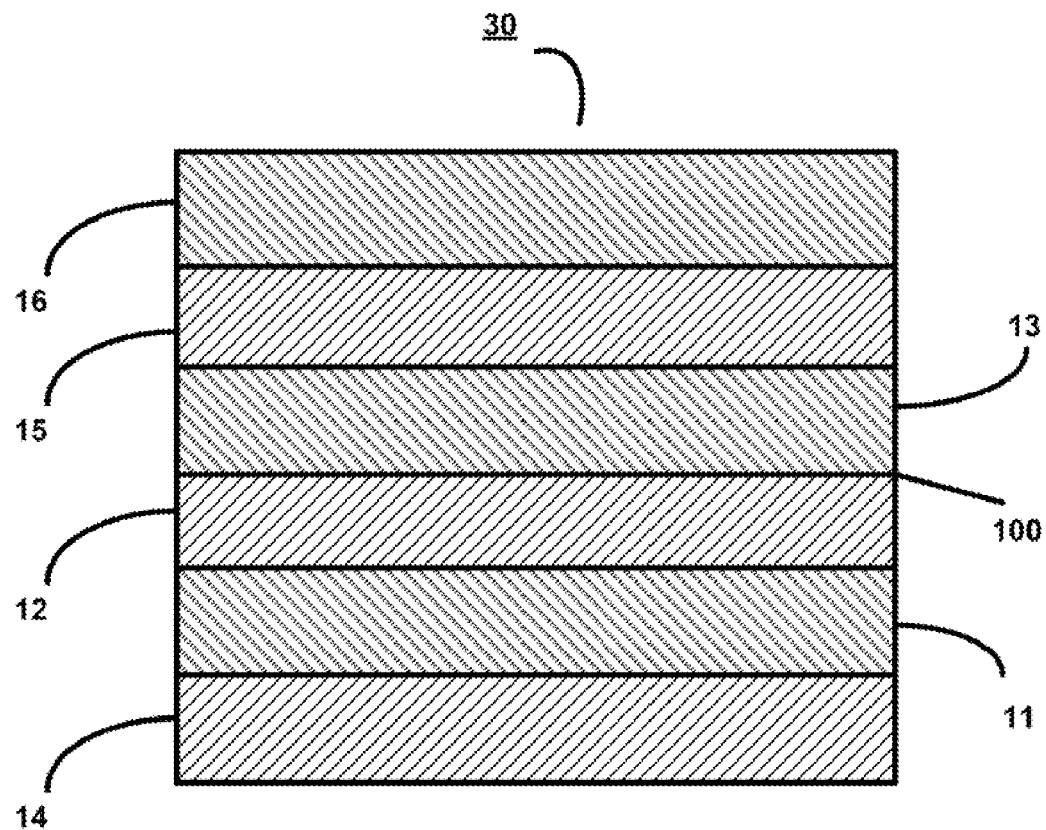
FIG. 3 shows a diagrammatic a cross-sectional view of a peelable resealable multilayer film having six thermoplastic layers according to the present disclosure.

There is seen in FIG. 3 a peelable resealable multilayer film 30 incorporating first layer 11, second layer 12, third layer 13, fourth layer 14 and fifth layer 15 of film 20 into a six-layer structure. As shown, fifth layer 15 is an interior-film layer and is in direct contact with and bonded to both third layer 13 and sixth layer 16. Fifth layer 15 may comprise a polyolefin, preferably a blend of linear low density polyethylene and ethylene/vinyl acetate copolymer. Sixth layer 16 may comprise a material selected from the group consisting of polyethylene terephthalate, polystyrene, polyvinyl chloride and blends thereof, all of which includes a peelable resealable interface formed between the second and third layers.

Film 30 further includes peelable/resealable interface 100. The values of A and B may be identical to those described for film 10 above.

Figure 4:
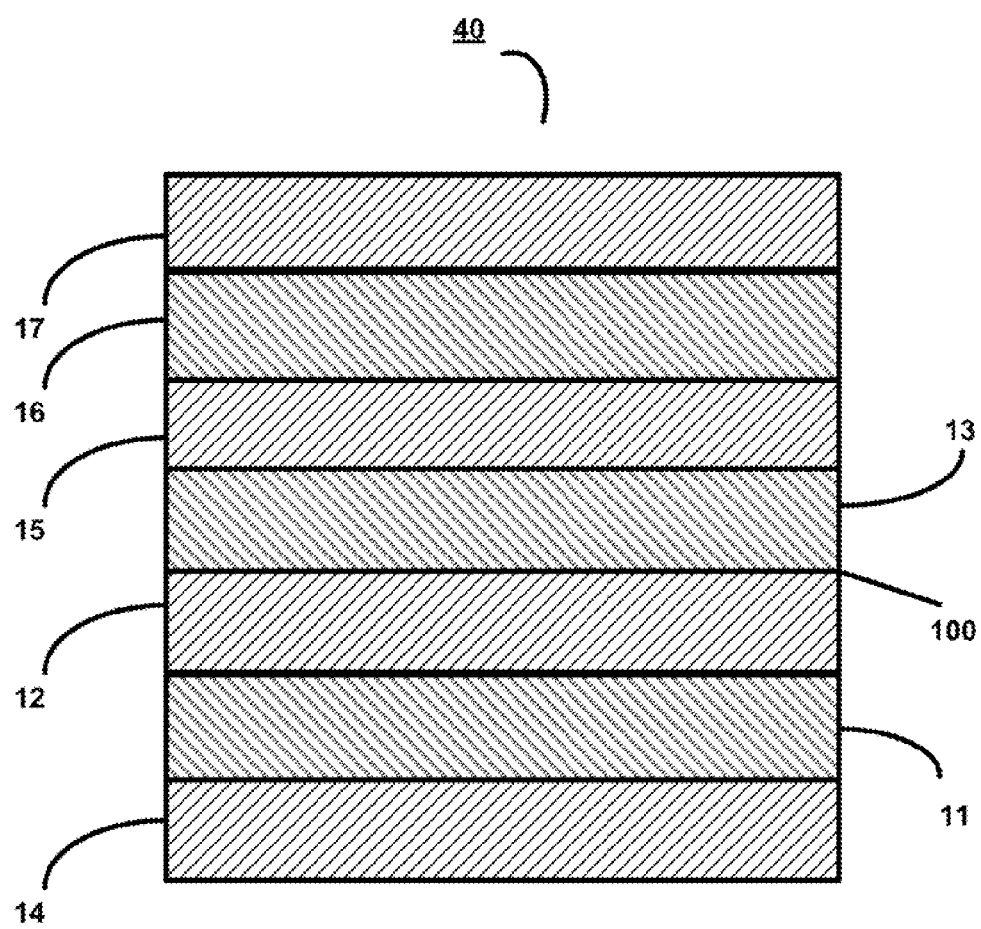
FIG. 4 shows a diagrammatic a cross-sectional view of a peelable resealable multilayer film having seven thermoplastic layers according to the present disclosure.

Turning to FIG. 4, there is shown peelable resealable multilayer film 40 incorporating first layer 11, second layer 12, third layer 13, fourth layer 14, fifth layer 15 and sixth layer 16 of film 30 into a seven-layer film structure. In this embodiment of the present invention, sixth layer 16 is an interior-film layer and is in direct contact with and bonded to both fifth layer 15 and seventh layer 17. Sixth layer 16 may comprises a laminating adhesive. Seventh layer 17 is an exterior-film layer and may comprise a material selected from the group consisting of oriented or non-oriented polyethylene terephthalate, oriented polypropylene, oriented polyamide and blends thereof.

Film 40 further includes peelable/resealable interface 100. The values of A and B may be identical to those described for film 10 above.

Preferably, films 10, 20, 30 and 40 each have a heat shrinkage value of less than about 5% in the machine direction at 90° C. and less than about 5% in the transverse direction at 90° C., as measured in accordance with ASTM D-2732-96 test method.

Well-known cast slot or blown film coextrusion methods may be used to form films 10, 20 and 30. Preferably, films 10, 20 and 30 are each formed by blown film coextrusion and more preferably, by single-bubble blown film coextrusion. In an alternative method, film 30 may be produced by coextrusion of first layer 11, second layer 12, third layer 13, fourth layer 14, fifth layer 15, followed by extrusion lamination of sixth layer 16. Film 40 may be formed by blown film coextrusion of first layer 11, second layer 12, third layer 13, fourth layer 14 fifth layer 15, followed by adhesive lamination of seventh layer 17 with sixth layer 16.

Small amounts of additives, such as slip or anti-block agents, pigments and other processing aids, can be included in any of the layers in the peelable resealable multilayer films 10, 20, 30 and 40.

The disclosure will now be further described in the following non-limiting example:

In the following examples, all film structures are produced using a single-bubble coextrusion apparatus and method. The single-bubble blown film apparatus includes a multi-manifold annular die head for blown bubble film through which the film composition is forced and formed into a cylindrical tube or bubble. The bubble is immediately quenched, e.g., via cooled water bath, solid surface and/or air, and then ultimately collapsed and formed into a film.

EXAMPLE 1

The following resins were coextruded in the following structural relationship in accordance with film 10 of FIG. 1:

Layer 11: first layer comprises 100% by weight of an anhydride-modified polyethylene having a density of 0.916 g/cm$^3$, a melt index of 1.1 dg/min., and a Vicat softening point of 103° C., which is sold under the trademark PLEXAR® PX3084 by Lyondell (Equistar) Chemical Company, Houston, Tex., U.S.A. Alternative materials for use in first layer 11 include anhydride-modified linear low density polyethylenes having a density of 0.91 g/cm$^3$, a melt index of 2.7 dg/min., a Vicat softening point of 103° C. and a melting point of 115° C.;

Layer 12: second layer comprises 100% by weight of an ethylene/vinyl alcohol copolymer having an ethylene content of 38 mol %, a melt index of 3.2 dg/min. (at 210° C., 2160 g), a melting point of 173° C., and a glass transition temperature of 58° C., which is sold under the trademark Soarnol® ET3803 from Soarus LLC, Arlington Heights, Ill., U.S.A. Alternative materials for use in second layer 12 include ethylene/vinyl alcohol copolymers having an ethylene content of 38 mol %, a density of 1.17 g/cm$^3$, a melt index of 1.7 dg/min. (at 190° C., 2160 g), a melting point of 172° C., and a glass transition temperature of 53° C., which is sold under the trademark EVAL® H171 by Kuraray Company, LTD, Tokyo, Japan.

Layer 13: third layer comprises 100% by weight of a tacky pressure-sensitive adhesive available under the product name FINDLEY® M3156 from Bostik Findley, Inc., Wauwatosa, Wis., U.S.A.

EXAMPLE 2

In Example 2, the resins were coextruded in the following structural relationship in accordance with film 20 of FIG. 2:

The film layers 11, 12 and 13 were identical in chemical composition as described in Example 1.

Layer 14: fourth layer comprised 95% by weight of a low-density polyethylene having a density of 0.923 g/cm$^3$, a melt index of 2.6 dg/min., and a melting point of 113° C., which is sold under the trademark DOW POLYETHYLENE® 608A by The Dow Chemical Company. Midland, Mich., U.S.A. and 5% by weight of a polyethylene masterbatch of antiblock additive. Alternative materials for use in layer 14 include low density polyethylene having a density of 0.921 g/cm$^3$, a melt index of 2.0 dg/min., and a melting point of between 182° C. and 193° C., which can be identified as EF1820 available from Westlake Chemical Company, Houston, Tex., U.S.A; and Layer 15: fifth layer comprised a blend of 66.7% by weight of a first component of a linear low density polyethylene having a melt index of 1.0 dg/min., a density of 0.918 g/cm$^3$, and a melting point of 121° C., which is available under the tradename ExxonMobil LLDPE LL1001.32 from ExxonMobil Chemical Company, Houston, Tex., U.S.A., 30% by weight of a second component of low-density polyethylene having a density of 0.923 g/cm$^3$, a melt index of 2.6 dg/min., and a melting point of 113° C., which is sold under the trademark DOW POLYETHYLENE® 608A by The Dow Chemical Company, Midland, Mich., U.S.A. and 3.3% by weight of a third component of a polyethylene masterbatch containing antiblock, slip additive and processing aids. Suitable alternative materials for the first component include linear low density polyethylene having a melt index of 1.0 dg/min., a density of 0.918 g/cm$^3$, and a melting point of between 195° C. and 220° C., which is sold under the trademark Novapol® Butene Copolymer LLDPE PF-0118-F from Nova. Chemicals Inc., Moon Township, Pa., U.S.A. Suitable alternative materials for the second component include low density polyethylene having a melt index of 2.0 dg/min., a density of 0.923 g/cm$^3$, and a melting point of between 182° C. and 199° C., which can be identified as EG412 available from Westlake Chemical Company, Houston, Tex., U.S.A.

Layers 11, 12, 13, 14 and 15 provided 2.54% by weight, 4.28% by weight, 11.87% by weight, 4.24% by weight and 19.47% by weight, respectively, of the total weight of the multilayer film 20. Film 20 had a total basis weight of 42.40. Layers 11, 12, 13, 14 and 15 had a thickness of 6%, 10.1%, 28%, 10.0% and 45.9%, respectively, relative to the total thickness of film 20. The film 20 described in Example 2 had a thickness of approximately 2.75 mils.

Multilayer film 20 described above in Examples 1 was formed via a coextrusion process. The film was formed by combining different streams of melt-plastitied polymers into a single structure by slot or flat cast or blown bubble coextrusion. The flat die or slot cast process includes extruding polymer streams through a flat or slot die onto a chilled roll and subsequently winding the film onto a core to form a roll of film for further processing. In the blown bubble coextrusion process, streams of melt-plastified polymers are forced through an annular die having a central mandrel to form a tubular extrudate. The tubular extrudate is preferably expanded to a desired wall thickness by a volume of air or other gas entering the hollow interior of the extrudate via the mandrel, and then rapidly cooled or quenched by any of various methods known to those of skill in the art. The peelable resealable multilayer film of the present invention may vary in thickness of between 0.5 mil and 40 mil., and preferably, between 1.5 mil and 10 mil, more preferably between 1.5 mil and 5 mil, and most preferably between 1.5 mil and 4 mil.

Table 1 illustrates peel strengths of the peelable resealable interfacial 100 formed between layer 12 and layer 13 for film 20 described in Example 2. The peel strengths were measured by heat-sealing layer 14 to a second thermoplastic film of polyethylene at a temperature of about 149° C. (400° F.), under a pressure of 30 psi and dwell time of one second. All peel strengths were determined in accordance to ASTM F-904 test method as described herein. First interfacial peel strength "A" and second interfacial peel strength "B" of film 20 are indicated below.

TABLE 1

|  | A (gram-force/inch) | B (gram-force/inch) |
|---|---|---|
| Trial 1 | 3439 | 617 |
| Trial 2 | 3374 | 889 |
| Trial 3 | 3494 | 641 |
| Trial 4 | 3311 | 723 |
| Trial 5 | 3571 | 747 |
| Trial 6 | 3145 | 593 |
| Trial 7 | 3499 | 660 |
| Trial 8 | 3371 | 850 |
| Trial 9 | 3389 | 735 |
| Trial 10 | 3432 | 684 |
| Average | 3362 | 714 |

Unless otherwise noted, the physical properties and performance characteristics reported herein were measured by test procedures similar to the following methods. The following ASTM test procedures are incorporated herein by reference in their entireties:

| | |
|---|---|
| Density | ASTM D-1505 |
| Glass Transition Temperature | ASTM D-3417 |
| Heat Shrinkage | ASTM D-2732-96 |
| Melt Index | ASTM D-1238 |
| Melting Point | ASTM D-3417 |
| Peal Strength | ASTM F-904 |
| Vicat Softening Point | ASTM D-1525 |

While various embodiments of the disclosure are herein described, it is envisioned that those skilled in the art may devise various modifications and equivalents without departing from the spirit and scope of the disclosure. The disclosure is not intended to be limited by the foregoing detailed description.

What is claimed is:

1. A peelable resealable multilayer film comprising:
   a first, thermoplastic layer;
   a second, thermoplastic interior-film layer comprising an ethylene/vinyl alcohol copolymer;
   a third, thermoplastic interior-film layer comprising a tacky pressure-sensitive adhesive;
   wherein said second layer is in direct contact with and bonded to both said first and third layers;
   wherein said bond between said second and third layers comprises a peelable resealable interface having a first interfacial peel strength A with a value of between 1000gram-force/inch (175.1 Newton/meter) and 5000 gram-force/inch (875.5 Newton/meter) as measured in accordance with ASTM F-904 test method and a second interfacial peel strength B with a value of between 350 gram-force/inch (61.3 Newton/meter) and 1000gram-force/inch (175.1 Newtons/meter) as measured in accordance with ASTM F-904;

and the relative values of A and B satisfy the relationship A >B.

2. The film according to claim 1, wherein said film is coextruded by either slot cast or blown film coextrusion.

3. The film according to claim 1, wherein said first layer comprises an anhydride-modified polyolefin.

4. The film according to claim 3, wherein said first layer comprises between 50% by weight and 100% by weight of an anhydride-modified polyolefin.

5. The film according to claim 3, wherein said first layer comprises between 50% by weight and 100% by weight of an anhydride-modified polyethylene.

6. The film according to claim 1, wherein said second layer comprises between 50% by weight and 100% by weight of an ethylene/vinyl alcohol copolymer.

7. The film according to claim 1, wherein said third layer comprises between 50% by weight and 100% by weight of a tacky pressure-sensitive adhesive.

8. The film according to claim 7, wherein said third layer comprises between 50% by weight and 100% by weight of a tacky pressure-sensitive adhesive comprising a tackifier first component and an elastomer second component of styrene/rubber copolymer.

9. The film according to claim 1, wherein said A value is between 2000 gram-force/inch (350.2 Newton/meter) and 5000 gram-force/inch (875.5 Newton/meter) as measured in accordance with ASTM F-904.

10. The film according to claim 1, wherein said B value is between 500 gram-force/inch (87.6Newton/meter) and 1000 gram-force/inch (175.1 Newton/meter) as measured in accordance with ASTM F-904.

11. The film according to claim 10, wherein said B value is between 600 gram-force (105.1 Newton/meter) and 800 gram-force/inch (140.1 Newton/meter) as measured in accordance with ASTM F-904.

12. The film according to claim 1, further comprising a fourth, thermoplastic layer of a material selected from the group consisting of polyolefin, ionomer and blends thereof.

13. The film according to claim 12, wherein said fourth layer comprises a low density polyethylene.

14. The film according to claim 13, wherein said fourth layer comprises between 50% by weight and 100% by weight of a low density polyethylene.

15. The film according to claim 12, wherein said fourth layer is in direct contact with said first layer.

16. The film according to claim 12, wherein said fourth layer is an exterior film layer.

17. The film according to claim 12, wherein said fourth layer is heat-sealable.

18. The film according to claim 12, further comprising a fifth, thermoplastic layer of a material selected from the group consisting of polyolefin, ionomer and blends thereof.

19. The film according to claim 18, wherein said fifth layer comprises a blend of a linear low density polyethylene and a low density polyethylene.

20. The film according to claim 18, wherein said fifth layer comprises between 50% by weight and 100% by weight of a blend of a linear low density polyethylene and a low density polyethylene.

21. The filth according to claim 18, wherein said fifth layer comprises a blend of a linear low density polyethylene and an ethylene/vinyl acrylate copolymer.

22. The film according to claim 18, wherein said fifth layer is in direct contact with said third layer.

23. The film according to claim 18, wherein said fifth layer is an exterior film layer.

24. The film according to claim 18, wherein said fifth layer is an interior film layer.

25. The film according to claim 18, further comprising a sixth, thermoplastic layer of a material selected from the group consisting of laminating adhesive, polyethylene terephthalate, polystyrene, polyvinyl chloride and blends thereof.

26. The film according to claim 25, further comprising a seventh, thermoplastic layer of a material selected from the group consisting of oriented or non-oriented polyethylene terephthalate, oriented polypropylene, oriented polyamide and blends thereof.

27. The film according to claim 26, wherein said seventh layer is an exterior film layer.

28. The film according to claim 1, wherein said film has heat shrinkage value less than about 5% in the machine direction at 90° C. and less than about 5% in the transverse direction at 90° C., as measured in accordance with ASTM D-2732-96 test method.

29. The film according to claim 1, wherein said film forms peelable reclosable package or a portion thereof.

30. A peelable resealable multilayer film comprising:
    a first, thermoplastic interior-film layer comprising between 50% by weight and 100% by weight of an anhydride-modified polyethylene;
    a second, thermoplastic interior-film layer comprising between 50% by weight and 100% by weight of an ethylene/vinyl alcohol copolymer;
    a third, thermoplastic interior-film layer comprising 50% by weight and 100% by weight of a tacky pressure-sensitive adhesive;
    a fourth, thermoplastic exterior-film layer comprising 50% by weight and 100% by weight of a low density polyethylene;
    a fifth, thermoplastic exterior-film layer comprising between 50% by weight and 100% by weight of a blend of a linear low density polyethylene and a low density polyethylene;
    wherein said second layer is in direct contact with and bonded to both said first and third layers; wherein said fourth layer is in direct contact with said first layer, and said fifth layer is in direct contact with said third layer;
    wherein said bond between said second and third layers comprises a peelable resealable interface having a first interfacial peel strength A with a value of between 1000 gram-force (175.1 Newton/meter) and 5000 gram-force/inch (875.5 Newton/meter) as measured in accordance with ASTM F-904 test method, and a second interfacial peel strength B with a value of between 350 gram-force/inch (61.3 Newton/meter) and 1000gram-force (175.1 Newton/meter) as measured in accordance with ASTM F-904;
    and the relative values of A and B satisfy the relationship A >B.

31. The film according to claim 30, wherein said A value is between 2000 gram-force/inch (350.2 Newton/meter) and 5000 gram-force/inch (875.5 Newton/meter) as measured in accordance with ASTM F-904.

32. The film according to claim 30, wherein said B value is between 500 gram-force/inch (87.6 Newton/meter) and 1000 gram-force/inch (175.1 Newton/meter) as measured in accordance with ASTM F-904.

33. The film according to claim 32, wherein said B value is between 600 gram-force/inch (105.1 Newton/meter) and 800 gram-force/inch (140.1 Newton/meter) as measured in accordance with ASTM F-904.

34. The film according to claim 30, wherein said third layer comprises between 50% by weight and 100% by weight of a tacky pressure-sensitive adhesive comprising a tackifier first component and an elastomer second component of styrene/rubber copolymer.

35. The film according to claim 30, wherein said fourth layer is heat-sealable.

36. The film according to claim 30, further comprising a sixth, thermoplastic layer of a material selected from the group consisting of laminating adhesive, polyethylene terephthalate, polystyrene, polyvinyl chloride and blends thereof.

37. The film according to claim 36, further comprising a seventh, thermoplastic exterior-film layer of a material selected from the group consisting of oriented or non-oriented polyethylene terephthalate, oriented polypropylene, oriented polyamide, and blends thereof.

38. The film according to claim 30, wherein said film has heat shrinkage value less than about 5% in the machine direction at 90° C. and less than about 5% in the transverse direction at 90° C., as measured in accordance with ASTM D-2732-96 test method.

39. The film according to claim 30, wherein said film forms peelable reclosable package or a portion thereof.

40. A peelable resealable multilayer film comprising:
   a first, thermoplastic interior-film layer comprising between 50% by weight and 100% by weight of an anhydride-modified polyethylene;
   a second, thermoplastic interior-film layer comprising between 50% by weight and 100% by weight of an ethylene/vinyl alcohol copolymer;
   a third, thermoplastic interior-film layer comprising 50% by weight and 100% by weight of a tacky pressure-sensitive adhesive;
   a fourth, thermoplastic exterior-film layer comprising 50% by weight and 100% by weight of a low density polyethylene;
   a fifth, thermoplastic interior-film layer comprising between 50% by weight and 100% by weight of a blend of a linear low density polyethylene and a low density polyethylene;
   a sixth, thermoplastic interior-film layer comprising a laminating adhesive;
   a seventh, exterior-film layer comprising a material selected from the group consisting of oriented or non-oriented polyethylene terephthalate, oriented polypropylene, oriented polyamide and blends thereof;
   wherein said second layer is in direct contact with and bonded to both said first and third layers; said fourth layer is in direct contact with and bonded to said first layer, said fifth layer is in direct contact with and bonded to said third layer and said sixth layer; said seventh layer is in direct contact with and bonded to said sixth layer;
   wherein said bond between said second and third layers comprises a peelable resealable interface having a first interfacial peel strength A with a value of between 1000 gram-force (175.1 Newton/meter) and 5000 gram-force/inch (875.5 Newton/meter) as measured in accordance with ASTM F-904 test method, and a second interfacial peel strength B with a value of between 350 gram-force/inch (61.3 Newton/meter) and 1000 gram-force (175.1 Newton/meter) as measured in accordance with ASTM F-904;
   and the relative values of A and B satisfy the relationship A >B.

41. The film according to claim 40, wherein said A value is between 2000 gram-force/inch (350.2 Newton/meter) and 5000 gram-force/inch (875.5 Newton/meter) as measured in accordance with ASTM F-904.

42. The film according to claim 40, wherein said B value is between 500gram-force/inch (87.6 Newton/meter) and 1000 gram-force/inch (175.1Newton/meter) as measured in accordance with ASTM F-904.

43. The film according to claim 42, wherein said B value is between 600 gram-force/inch (105.1 Newton/meter) and 800 gram-force/inch (140.1 Newton/meter) as measured in accordance with ASTM F-904.

44. The film according to claim 40, wherein said third layer comprises between 50% by weight and 100% by weight of a tacky pressure-sensitive adhesive comprising a tackifier first component and an elastomer second component of styrene/rubber copolymer.

45. The film according to claim 40, wherein said fourth layer is heat-sealable.

46. The film according to claim 40, wherein said film forms peelable reclosable package or a portion thereof.

* * * * *

UNITED STATES PATENT AND TRADEMARK OFFICE
CERTIFICATE OF CORRECTION

PATENT NO. : 8,329,276 B2
APPLICATION NO. : 13/043177
DATED : December 11, 2012
INVENTOR(S) : Tara Kay Cruz It is certified that error appears in the above-identified patent and that said Letters Patent is hereby corrected as shown below:

In the Specification

In column 4, line 7, delete "as," and insert -- as --, therefor.

In column 6, line 46, delete "copolymers*" and insert -- copolymers --, therefor.

In column 6, line 50, delete "Such" and insert -- such --, therefor.

In column 8, line 52, delete "grain-" and insert -- gram- --, therefor.

In column 9, line 2, delete "grain-" and insert -- gram- --, therefor.

In column 10, line 22, delete "14" and insert -- 14, --, therefor.

In column 11, line 42, delete "Nova." and insert -- Nova --, therefor.

In column 11, line 58, delete "plastitied" and insert -- plastified --, therefor.

In the Claims

In column 13, line 1, in claim 1, delete "1000gram" and insert -- 1000 gram --, therefor.

In column 13, lines 8-9, in claim 1, delete "A >B." and insert -- $A \geq B.$ --, therefor.

In column 13, line 37, in claim 10, delete "87.6Newton" and insert -- 87.6 Newton --, therefor.

In column 13, line 41, in claim 11, delete "gram-force" and insert -- gram-force/inch --, therefor.

In column 13, line 64, in claim 20, delete "claim 18," and insert -- claim 19, --, therefor.

In column 14, line 1, in claim 21, delete "filth" and insert -- film --, therefor.

In column 14, line 55, in claim 30, delete "gram-force" and insert -- gram-force/inch --, therefor.

In column 14, line 59, in claim 30, delete "1000gram-force" and insert -- 1000 gram-force/inch --, therefor.

In column 14, lines 62-63, in claim 30, delete "A >B." and insert -- $A \geq B.$ --, therefor.

In column 16, line 16, in claim 40, delete "gram-force" and insert -- gram-force/inch --, therefor.

In column 16, line 20, in claim 40, delete "61.3Newton" and insert -- 61.3 Newton --, therefor.

Signed and Sealed this
Eleventh Day of August, 2015

Michelle K. Lee
*Director of the United States Patent and Trademark Office*

CERTIFICATE OF CORRECTION (continued)
U.S. Pat. No. 8,329,276 B2

In column 16, line 20, in claim 40, delete "gram-force" and insert -- gram-force/inch --, therefor.

In column 16, lines 23-24, in claim 40, delete "A >B." and insert -- $A \geq B.$ --, therefor.

In column 16, line 30, in claim 42, delete "500gram" and insert -- 500 gram --, therefor.

In column 16, line 31, in claim 42, delete "175.1Newton" and insert -- 175.1 Newton --, therefor.